United States Patent Office 2,695,277
Patented Nov. 23, 1954

2,695,277

AQUEOUS RESIN-WAX FLOOR COATING DISPERSIONS

Arthur C. Pabst, Douglaston, Rudolph J. Holzinger, North Merrick, and Elizabeth J. Gavin, Port Washington, N. Y., assignors to Socony-Vacuum Oil Company, Incorporated, a corporation of New York No Drawing. Application June 28, 1951,
Serial No. 234,146

4 Claims. (Cl. 260—28.5)

The present invention relates to coating materials of the water dispersed type for use on floors and other horizontal surfaces, such as stair treads, table and counter tops and the like and, more particularly, to such dispersions in which the particle size of the resin particles is maintained below a critical maximum.

The materials in most common use at the present time are water dispersions of waxes of the self-polishing type. These polishes are based primarily on hard natural waxes such as carnauba, ouricury or candelilla wax. Other waxes or wax-like substances may be incorporated in lesser amounts; such as waxes derived from petroleum or synthetic wax-like materials. It has been found, however, that these latter materials, while considerably cheaper than the hard vegetable waxes, will interfere with proper dispersion of the solids or impart other undesirable characteristics. For instance, many of them will require comparatively large amounts of emulsifiers in order to attain the correct particle size necessary to give gloss to the dried film. Since the majority of commercial emulsifiers available for this purpose are liquids or semi-solids, it is evident that the incorporation of emulsifiers in excessive amounts will tend to soften the deposited film with attendant lowered performance as to protective value and resistance to dirt pick-up. The use of hard natural waxes as the main film-forming ingredients entails other drawbacks besides their scarcity and high cost, notably that of slipperiness. In order to overcome these shortcomings, wax manufacturers have long sought to utilize natural or synthetic resins or resinous substances vide U. S. Patents Nos. 2,127,381; 2,137,636; 2,136,450; 2,232,595; 2,273,780; 2,348,756; and 2,404,519. For instance, some resins such as shellac, rosin, Manila gum, etc. have been employed, in the form of an ammoniacal solution, as an additive to the finished wax dispersion. While these and similar materials are advantageous from the standpoint of cost of the finished product, they tend to increase further the slipperiness or tackiness or otherwise interfere with the wearing qualities of the dried coating, especially, if incorporated in amounts larger than, say 20 or 30 per cent of the total film-forming ingredients. Other resins, notably those of the chemically modified or synthetic types, have been incorporated during the processing of the wax dispersion, by melting them together with the waxes or wax blends employed. Their use, particularly in amounts constituting a part greater than 20 or 30 per cent, based on total solids present, has raised similar objections. It was found, for instance, that the use of materials like rosin-modified phenolics or alkyds in such proportions tended to impart resinous characteristics to the film and made it more susceptible to temperature changes. That is to say, such a film would tend to be hard and slippery in winter, while somewhat soft and distinctly tacky in summertime. It was further observed that many commercially available resins compatible with molten waxes and possessing a melting or softening point sufficiently low to allow incorporation in this manner, when blended in such a manner with waxes exhibited a phenomenon known as mutual plasticizing action thus further increasing the tendency towards excessive tackiness. Resins of higher melting or softening point could not generally be used because of limitations imposed by the equipment at the disposal of the wax manufacturer. It was also found that many resins, if incorporated in significant amounts, interfered with proper dispersion of the combined resin-wax phase in a manner similar to the one described above on petroleum waxes. Prior art wax coatings for flooring and similar surfaces suffer from still another limitation, namely, that of permissible or desirable concentration, which in turn limits the thickness and protective value of the deposited film. It has been found that many commercial wax polishes of the type described when made up to contain amounts of total solids in excess of 20 per cent, will within a short time, tend to thicken or even to gel or set-up to a solid mass, thus rendering the product unfit for use. Even during the initial stages of this process, changes in the colloidal state of the dispersion appear to take place, such as agglomeration of the original wax particles into larger aggregates, impairing or destroying the gloss of the dried film. While a concentration of solids in excess of the above figures is thus impractical because of poor stability, it is also undesirable because of the color of the wax film produced. Natural waxes such as carnauba and ouricury vary in color from light yellow to dark brown or greyish-brown for the more available grades. Thus, most wax films will have a tendency to discolor the surface to which they are applied, especially those which are of a light color or pastel shade. This tendency is the more pronounced the heavier the coating produced, and it will be thus seen, that a wax polish of higher concentration will produce an undesirable effect. Another recent approach to the problem of utilizing resins for the protection of flooring and similar surfaces has been the attempt to employ conventional coatings of the lacquer type. While products of this class will permit the application of most resins or plastics regardless of softening point, they will, as a rule, not permit the incorporation of waxes in significant amounts. They also have other important disadvantages, chiefly those inherent in the use of solvents as the liquefying medium. Such drawbacks are solvating or swelling action on the flooring material itself or the binder used in its composition, as in the case of rubber, linoleum, asphalt tile or similar materials. Still more serious objections are the hazards presented during manufacture, handling, shipping and application, such as flammability of the product and ingredients, and explosiveness and toxic effects of the vapors. Because of these limitations, products of this type have not met with general favor.

It is one of the objects of this invention to provide preparations suited for protection of flooring and other horizontal surfaces without the inherent disadvantages of prior art preparations. It is another object of the present invention to provide materials to replace a major portion or the total amount of expensive and scarce natural waxes with synthetic resins or plastics without interfering substantially with the proper dispersion of the final product. It is a further object of this invention to replace expensive and scarce waxes wholly or in part substantially without imparting undesirable characteristics to the dried film, such as lowered protective value and greater dirt pick-up. Another object of this invention is to incorporate resinous materials or plastics in the product without regard for solubility in aqueous alkali, melting or softening point, or compatability with waxes in the molten stage. In addition it is an object of this invention to permit the use of higher concentrations of active ingredients, i. e., waxes and resins, etc. and the deposition of a heavier film from the same number of applications (or of films of equal thickness from fewer applications) without incurring difficulties of stability of the finished preparation or problems of discoloration due to the heavier coating. It is still another object of this invention to provide coatings from such resins or plastics without resorting to the use of expensive and hazardous solvents. Another object is to provide coatings of superior performance characterictics, particularly as to gloss and spreading properties. Other objects of this invention will be recognized by those skilled in the art, from the following description.

It has now been discovered that the aforementioned objects can be accomplished by the use of wax-immiscible resins or plastics prepared by the process known as emulsion polymerization. A brief outline of the process known as emulsion polymerization is given in "The Technology of Plastics and Resins," Mason Manning, Van Nostrand (1947), pages 34 and 35. In this process, the monomer or monomers, which as a rule are liquids or substances of comparatively low melting point generally below the boiling point of water, are finely dispersed in water by means of dispersing or emulsifying agents, and polymerized in situ. It has further been discovered that dispersions of such wax-immiscible materials, if suitably prepared, are compatible with conventional wax polishes of the water-dispersion type. It has also been found, that resinous preparations of the type described (aqueous dispersions) can be used without the admixture of wax dispersions. While resin dispersion as such for use as protective coatings are not new, their use in the past has been confined to industrial applications. Applications of this sort usually require thicknesses of coatings considerably in excess of those contemplated in the present invention, are carried out by such means as roller or knife coating, brushing, spraying, etc. and require viscosities substantially in the range of conventional coating materials used in this manner such as lacquers, varnishes, enamels in order to avoid excessive run-off. For this reason, resin dispersions in the past have been used in conjunction with bodying agents or thickeners, while in the present application, the inherent low viscosity is not objectionable but advantageous since it permits a type of application familiar to the user of emulsion-type floor waxes, by means of lambs wool applicator, string mop, cloth pad and so on. It is also to be noted that resin dispersions bodied so as to permit application by roller, brush, spray or similar means generally require drying periods of several hours or days at ordinary temperatures. For this reason, force-drying at elevated temperatures is usually resorted to in order to reduce the drying time to a reasonable and economically feasible period. Whereas coatings of the viscosity and general characteristics contemplated, when applied in the manner intended, will dry to a usable condition within an hour or less at ordinarily prevailing temperatures.

It has been found that the use of such wax-immiscible resin dispersions overcomes most of the shortcomings of prior art preparations. Materials of this type are potentially abundant and cheap, uniform in nature, non-slippery, non-tacky, can be produced to any desirable hardness and toughness, and possess substantially constant physical characteristics over a wide temperature range. It can also be seen that such wax-immiscible materials can be provided in substantially water-white color, and present no processing problems pertaining to high softening point, solubility in alkaline solutions or compatibility with waxes in the molten stage or solvents required. They can also be provided in concentrations well in excess of commercial wax polishes. Resin dispersions of the type proposed, while containing one or a mixture of several such wax-immiscible resins as the main constituents, may or may not contain other ingredients such as plasticizers, stabilizers, etc. in order to modify or enhance the characteristics of said dispersions or of the films deposited therefrom without departing from the spirit of this invention.

While in specific cases we elect to employ resin dispersions as the sole constituent, they can be incorporated in wax polishes in large or minor amounts in order to serve as wax extenders or modifiers.

Wax-immiscible resins produced by emulsion polymerization and suitable for use in this invention may be of widely divergent types. They may include materials of an elastomeric character, and they may be polymers or copolymers. It has been demonstrated experimentally that a wax-immiscible acrylic poylmer, wax-immiscible copolymers if vinyl acetate and acrylic resin, and a wax-immiscible resin of the polystyrene type are suitable. However, other wax-immiscible resins are equally suitable, and may be used without deviating from the spirit of this invention. We may also elect to use one or a combination of several of such wax-immiscible resins, either alone or in combination with waxes.

In order to make such combinations useful and permanently stable, it is necessary that the emulsifying, dispersing, wetting, stabilizing and/or similar agents employed in producing these resins and wax dispersions and mixtures thereof be compatible. Otherwise, coagulation, precipitation, increase of particle size or other undesirable effects may result.

Typical of various formulations within the scope of the present invention and illustrative of the comparable characteristics thereof and those of prior art floor coating dispersions are the formulations and the characteristics thereof tabulated hereinafter in Table I.

*Table I*

| | All Parts In Percent By Weight | | | | | |
|---|---|---|---|---|---|---|
| Polish No | 3 | 4 | 5 | 7 | 8 | 9 |
| Dispersion of Resin A 30% Solids | | | | | | |
| Dispersion of Resin A 20% Solids | | | | 80 | 70 | |
| Dispersion of Resin B 17% Solids | | | | | | 60 |
| Dispersion of Resin C 25% Solids | 50 | 15 | 30 | | | |
| Dispersion of Carnauba Wax 13% Solids [1] | 50 | 85 | 70 | 20 | 30 | |
| Dispersion of Carnauba-Mineral Wax 11% Solids | | | | | | 40 |
| Total Solids Content percent | 19 | 15 | 17 | 18.6 | 18.0 | 14.6 |
| Resin phase percent of Total Solids | 66 | 26 | 45 | 86.0 | 78.0 | 70.0 |
| Wax phase percent of Total Solids | 34 | 74 | 55 | 14.0 | 22.0 | 30.0 |

[1] Made up according to the following formula:

| | Wt. Percent |
|---|---|
| Carnauba wax No. 1 | 5.0 |
| Carnauba wax No. 3 refined | 5.0 |
| Oleic acid | 1.25 |
| Triethanolamine | 1.65 |
| Borax | 0.75 |
| Water | 86.35 |
| Total | 100.00 |

Resin A is a wax-immiscible polymer of methacrylic acid. In the aqueous dispersion employed, the resin particles had an average particle diameter of 0.275 micron.

Resin B is a wax-immiscible resin of polystyrene. In the aqueous dispersion employed, the resin particles had an average particle diameter of 0.21 micron.

Resin C is a wax-immiscible copolymer of vinyl acetate and methacrylic acid. In the aqueous dispersion employed, the resin particles were too small to be visible at a magnification of 400×.

*Table II*

| Polish No | 3 | 4 | 5 | 7 | 8 | 9 | 100% K | 100% L | 100% Resin A | 100% Resin B | 100% Carnauba Wax |
|---|---|---|---|---|---|---|---|---|---|---|---|
| Gloss (visual inspect, 2 coats) | Excellent | Excellent | Very Good | Excellent | Very Good | Good | Poor | Fair | Very Good | Very Good | Fair |
| 0°, 60° Specular Gloss (1 coat) | 19.7 | 14.3 | 14.8 | 15.2 | 13.1 | 11.5 | 13.9 | 10.8 | 17.3 | 15.5 | 11.6 |
| On Linoleum (2 coats) | 33.4 | 30.2 | 28.8 | 32.0 | 24.2 | 20.7 | 15.2 | 18.9 | 25.6 | 26.0 | 19.0 |
| 45°, 0° Reflectance | 0.630 | 0.650 | 0.651 | 0.714 | .707 | | 0.618 | 0.699 | 0.754 | 0.680 | 0.657 |
| Sward Hardness, Sec | 17.1 | 5.8 | 12.4 | 22.4 | 18.9 | 20.0 | 5.4 | 32.5 | 60.2 | 6.1 | 6.2 |

The value for 60°, 60° Specular Gloss was determined by means of the Hunter multipurpose reflectometer in accordance with Procedure C of ASTM Tentative Method D-523-44T. This method uses a gloss scale ranging from 0 to 1000, with higher figures denoting greater degrees of gloss and non-metallic coatings ranging from 0 to about 70.

The value for 45°, 0 Reflectance was measured according to ASTM Tentative Method D-771-44T on specimens perpared as specified in U. S. Bureau of Standards Tenative Draft (Revised) of Proposed Commercial Standards for Water Dispersion Floor Wax TS-4115, April 15, 1946. This method requires the use of a whiteness scale ranging from 0 to 1.000, with the latter value indicating perfect whiteness. The results obtained indicate the degree of discoloration imparted by the coating to the film supporting surface, lower values denoting a less satisfactory product. Materials giving a reading below .600 are considered unsatisfactory.

The Sward Hardness Rocker is an instrument of the pendulum type widely used in the paint and varnish industry to determine the drying time and ultimate hardness of surface coatings. It is based on the principle that its swing is slowed by tackiness or softness of the supporting surface. Therefore, lower values, as expressed in seconds of total time of movement, represent tackier and/or softer films and higher values represent less tacky and/or harder films. (Reference: H. A. Gardner, "Physical & Chemical Examination of Paints, Varnishes, Lacquers and Colors," 9 Edition, 1939, pages 109, 117.)

By comparing the characteristics of the coatings produced by two commercially available floor polishes ("K" and "L" in Table II) with the corresponding characteristics of the coatings produced by the novel wax-immiscible resin-wax dispersion polishes of the persent invention it will be found that the novel resin-wax dispersions provide coatings in some respects of at least as good quality and in some respects of better quality than the coatings provided by the commercially available polishes. Thus, for example, the gloss of the coating obtained from the novel resin-wax dispersions as determined by visual inspection is in every instance better than that of coatings obtained from commercially available wax polishes. The specular gloss of coatings obtained from all but two of the tested novel resin-wax dispersions is better than that of the commercial polishes and the specular gloss of the coatings from resin-wax dispersions 8 and 9 is at least as good as that of coatings obtained from commercial polishes although the novel resin-wax dispersions contain only about 4 weight per cent wax compared to 11 and 13 weight per cent wax in the commercial polishes.

All of these novel dispersions of wax-immiscible resins and waxes contain large percentages of wax-immiscible resin without the inherent drawbacks of such large concentrations of wax-immiscible resins, such as interference with proper dispersion of the final product, tackiness or softness, and thereby permit replacement of expensive natural waxes to a great degree. This is accomplished without the use of expensive or hazardous solvents. The solids content is higher in all instances than that of representative commercial preparations. In spite of this higher solids content, discoloration is reduced considerably. The gloss, both on one and two coat applications, is in excess of that of the commercial preparations. In all cases, the materials given as examples dried in one hour or less, had viscosities substantially equal to conventional wax dispersions, permitting application by conventional means and exhibited no settling or other inherent instability.

It has been pointed out hereinbefore that blends of wax-immiscible resin and wax dispersions are dependent for stability upon compatibility of emulsifying, dispersing, stabilizing and/or similar agents. It now appears that another factor is in evidence, namely, the particle size of the water-dispersed resin. It is a well known fact that wax emulsions of the self-polishing type, which is the type used in the present invention, have a particle size in the colloidal range. The range of colloidal particle size is generally given as from 1.0 to 0.001 micron, the upper limit of which by definition, coincides with the limit of resolving power of the light microscope. It now appears that the wax-immiscible resin particles must be of similar size if useful combinations of the two are to be obtained. On the basis of information now available, it appears that the resin dispersions found to give useful mixtures with waxes, have an average particle size of 1 micron or less, and probably in the range of somewhat below 0.3 micron to 0.03 to 0.01 micron. Several resins that have given unsatisfactory results have an average particle size above these figures. It appears, therefore, that suitability for the purpose intended does not depend primarily on the type of wax-immiscible resin but rather on its colloidal state, provided, of course, that requirements concerning the auxiliary ingredients of the dispersion in question are met.

It is to be noted that the resins of the novel resin-wax polishes discussed hereinbefore are of the wax-immiscible class. The members of this class are typified by those for which data are presented in Tables I and II and are resins which are insoluble or immiscible with waxes such as carnauba wax, mineral wax, ouricury and candelilla wax at temperatures up to and slightly above the melting point of the wax.

The present application is a continuation-in-part of our copending application Serial No. 16,144, filed March 20, 1948, now abandoned.

We claim:

1. A low-viscosity aqueous dispersion consisting essentially of a hard natural wax selected from the class consisting of carnauba wax, ouricury wax and candelilla wax, and a wax-immiscible resin produced by emulsion polymerization selected from the class consisting of polymethacrylic acid, polystyrene and copolymer of vinyl acetate and methacrylic acid, substantially all the wax particles and substantially all the wax-immiscible resin particles present in the aqueous dispersion being of the same average diameter and less than 1 micron.

2. A low viscosity aqueous dispersion, as described and set forth in claim 1, in which the average diameter of both wax and wax-immiscible resin particles is about 0.01 to about 0.3 micron.

3. A low viscosity aqueous dispersion consisting essentially of carnauba wax and a wax-immiscible copolymer of vinyl acetate and methacrylic acid produced by emulsion polymerization, the particles of both the wax and the wax-immiscible copolymer being of about the same average diameter and invisible at a magnification of 400X, said dispersion comprising about 50 to about 85 volume percent of an aqueous dispersion of said wax particles and about 50 to about 15 volume per cent of an aqueous dispersion of said wax-immiscible copolymer particles, said wax dispersion comprising about 5.0 weight per cent carnauba wax No. 1, about 5.0 weight per cent carnauba wax No. 3 refined, about 1.25 weight per cent oleic acid, about 1.65 weight per cent triethanolamine, about 0.75 weight per cent borax, and the balance to make 100 weight per cent water.

4. A low viscosity aqueous dispersion consisting essentially of carnauba wax, mineral wax and wax-immiscible polystyrene resin produced by emulsion polymerization, the average diameter of the particles of the wax and the wax-immiscible resin being about 0.21 micron, and said dispersion comprising about 40 volume per cent of an aqueous dispersion of carnauba and mineral waxes containing about 11 weight per cent solids and 60 volume per cent of an aqueous dispersion of wax-immiscible polystyrene containing about 17 weight per cent of solids.

References Cited in the file of this patent

UNITED STATES PATENTS

| Number | Name | Date |
|---|---|---|
| 2,540,996 | Ryden | Feb. 6, 1951 |
| 2,606,165 | Chapin et al. | Aug. 5, 1952 |